United States Patent
Shams et al.

(10) Patent No.: US 11,245,935 B1
(45) Date of Patent: Feb. 8, 2022

(54) MANAGING SUPPLEMENTAL CONTENT IN CONTENT DELIVERY SYSTEMS

(71) Applicant: Amazon Technologies, Inc., Seattle, WA (US)

(72) Inventors: Khawaja Shams, Portland, OR (US); Meera Jindal, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 43 days.

(21) Appl. No.: 16/446,475

(22) Filed: Jun. 19, 2019

(51) Int. Cl.
| H04N 7/10 | (2006.01) |
| H04N 7/025 | (2006.01) |
| H04N 21/234 | (2011.01) |
| H04N 21/232 | (2011.01) |
| H04N 21/231 | (2011.01) |
| H04N 21/24 | (2011.01) |
| H04N 21/2343 | (2011.01) |

(52) U.S. Cl.
CPC ..... H04N 21/23424 (2013.01); H04N 21/232 (2013.01); H04N 21/2343 (2013.01); H04N 21/23106 (2013.01); H04N 21/2407 (2013.01)

(58) Field of Classification Search
CPC ....... H04N 21/23424; H04N 21/23106; H04N 21/232; H04N 21/2343; H04N 21/2407
See application file for complete search history.

(56) References Cited

U.S. PATENT DOCUMENTS

| 2003/0101107 A1* | 5/2003 | Agarwal | G06Q 10/087 705/28 |
| 2011/0145857 A1* | 6/2011 | Agarwal | G06Q 30/02 725/32 |
| 2013/0067510 A1* | 3/2013 | Ahanger | H04N 21/25891 725/34 |
| 2015/0100438 A1* | 4/2015 | Malkin | G06Q 30/0277 705/14.73 |
| 2015/0358689 A1* | 12/2015 | Wen | H04L 65/40 725/32 |
| 2016/0210074 A1* | 7/2016 | Gerhart | G06F 3/0632 |
| 2020/0107061 A1* | 4/2020 | Huber | H04N 21/4622 |
| 2020/0220909 A1* | 7/2020 | Booth | H04L 65/4069 |

* cited by examiner

*Primary Examiner* — Kyu Chae
(74) *Attorney, Agent, or Firm* — Knobbe Martens Olson & Bear LLP

(57) ABSTRACT

A content delivery service includes a management service for determining an anticipated window of time in which supplemental content can be inserted in the dynamic content stream. The management service will then pre-fetch supplemental content from the third party supplemental content service prior the identification or request for supplemental content to be included in the streaming content. During the streaming of content to individual users via an established channel, as markers for insertion opportunities are identified, the content delivery service will attempt to utilize the pool of pre-fetched supplemental content.

22 Claims, 7 Drawing Sheets

MANAGING SUPPLEMENTAL CONTENT IN CONTENT DELIVERY SYSTEMS

BACKGROUND

Generally described, computing devices and communication networks can be utilized to exchange data or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery service provider. As with content providers, content delivery service providers also provide requested content to client computing devices often with consideration of efficient transmission of the requested content to the client computing device and/or consideration of a cost associated with the transmission of the content. Content delivery service provider can also integrate supplemental content, such as advertisement content, in streaming content embodiments.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
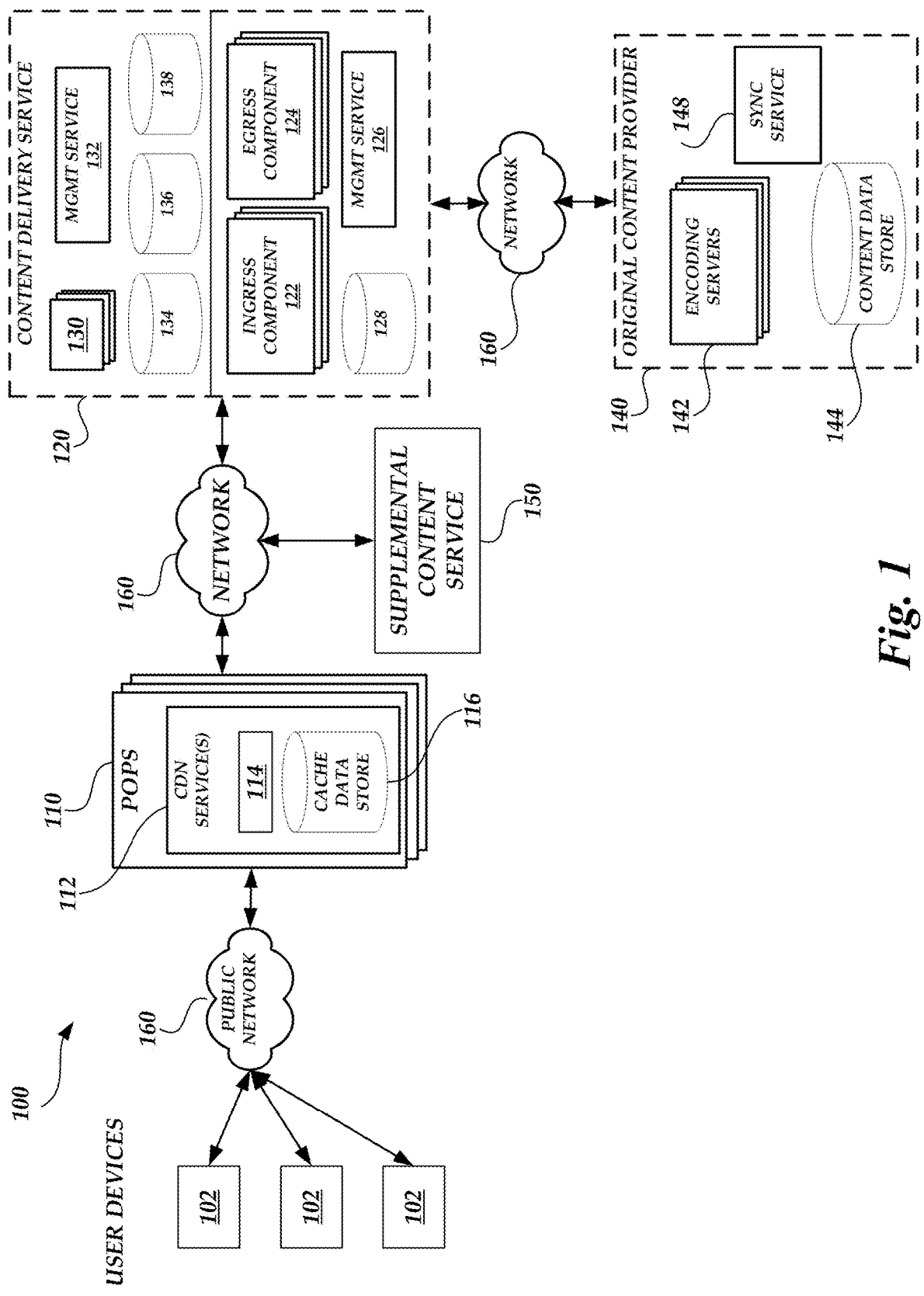
FIG. 1 is a block diagram of a content delivery environment that includes one or more user devices, a video packaging and origination service and an original content provider according to one embodiment.

Generally described, content providers can provide content to requesting users. With regard to video content, a content provider can implement a content delivery service that is able to deliver video content to requesting users. Illustratively, a content delivery service indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more.

In some embodiments, to deliver content, content providers can organize requested content, such as a video file, into multiple segments that are then transmitted to requesting devices, segment by segment. For example, in a video stream, each segment typically accounts for 2-10 seconds of video rendered on a receiving device. To provide content to the content delivery service, individual content segments can be encoded by an encoder and transmitted to the video and origination service. Traditionally, a single processing node on the content delivery service can receive an incoming stream of encoded segments or original encoded content for further processing.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are received by the packaging and origination service, the packaging and origination service is available to receive and process requests for encoded content. More specifically, client computing devices, through a respective software application, can request individual video segments according to the available encoded bitrates and formats as published in the manifest file.

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

Traditionally, content delivery services can maintain a one or more nodes or servers, e.g., an ingress node, to receive incoming encoded content streams and decode the source encoded content. More specifically, the single node can operate as an ingress node to receive individual content streams or channels corresponding to source encoded segments encoded to a specific encoding profile (e.g., encoding bitrate and format). The individual content streams or channels are provided by an original content provider. The ingress node can utilize state information that facilitates determination that all encoding versions of the same encoded segment have been received.

To support adaptive bitrate encoding or streaming, the ingress node decodes the source encoded content into an unencoded format. Thereafter, the unencoded content is encoded by one or more nodes or servers functioning as egress nodes, or encoders, that can process the decoded source content into one or more of the encoded content versions that will be available to requesting users. When a single node or server implements the functionality of both an ingress and egress node, the node can be referred to as a transcoding node that decoders incoming encoded content and generates one or more encoded content formats from the decoded original encoded content signal. Accordingly, reference to transcoding functionality can include decoding encoded original content, encoding previously decoded original content, or a combination thereof.

In some implementations, a content provider can include supplemental content, such as advertisement content or advertisements, that can be integrated by the content delivery service into the content segments forming the streamed content provide users. Typically, to obtain supplemental content, the content delivery service can request supplemental content, such as customized advertisements, from a third-party service. More specifically, in some embodiments, the original content provider can embed or integrate markers in the streaming content segments that identify opportunities to ingrate supplemental content. Accordingly, when a content delivery service identifies a marker, the content delivery service can request supplemental content from the third-party service and if content is available, provide encoded content segments corresponding to the supplemental content.

Traditional approaches to including supplemental content, such as advertisement content, can be deficient in a number of ways. In one aspect, the processing of requests to the third party service can be associated with latency or other delays. Such latencies and delays can increase the likelihood that the streaming content provided to requesting clients can require player buffering, which diminishes the user experience. In another aspect, if the third party service experiences a sufficiently long delay or errors in processing the result, the opportunity to provide supplemental content may be bypassed by the content delivery service, which corresponds to lost revenue opportunities and diminished customer experiences. Still further, errors or deficiencies associated traditional prior art approaches may be exemplified in for larger scale implementation. For example, a content delivery service may require additional processing time to individually process supplemental content that is unique to each individual user. Accordingly, as the number of users receiving content increases, the processing lag at the content delivery service can increase the delay or deficiency in providing the supplemental content. In another example, in embodiments that include multiple client devices receiving the same or similar content streams, the content delivery service would typically be required to transmit a number of parallel or substantially parallel supplemental content requests. Accordingly, as the number of receiving content increases, the number of parallel requests transmitted to the third party service would likely increase. This place a much greater strain on such third party services and could lead to additional delays or latencies in servicing supplemental content requests.

To address at least a portion of the inefficiencies described above with regard to processing of encoded content from content provider, aspects of the present application correspond to content delivery service that can receive and process encoded content streams from a content provider. The content delivery service further includes media streaming functionality that delivers streaming media to requesting users via a set of communication channel. As part of streaming content, a management service associated with the content delivery service can be implemented to dynamically insert supplemental content, such as advertisement content into the content streams. Illustratively, the management service can manage the insertion of specific supplemental content selected for individual content streams.

In accordance with the present application, to manage the dynamic insertion of supplemental content, the management service first obtains or otherwise monitors metrics associated with the active streaming channels. Such metrics include, but are not limited, manifest information that identifies the segments that will form the streaming content, performance measurements regarding processing of supplemental content requests, performance measurements regarding decoding and encoding received supplemental content, frequency of the presence of supplemental content insertion markers, encoding parameters for encoding supplemental content, and the like. Such metrics can also include external information or information otherwise independent of the transmission of the active streaming channel, such as social media information, weather information, public event information and the like. For individual content streams, the management service can determine an anticipated window of time in which supplemental content can received and processed and be ready to be inserted in the dynamic content stream, such as when a supplemental content insertion marker is detected in the original content stream. Such supplemental content insertion markers can be generally referred to as insertion opportunities.

Illustratively, the management service can determine the time window based historical information that predicts the number of insertion opportunities and the timing associated with predicted insertion opportunities, such as the likely appearance of insertion opportunities or timing between sequential insertion opportunities. The management service can then utilize the obtained or collected metrics to make adjustments to the timing windows. For example, the management service can utilize image analysis or audio analysis to determine whether the predicted number of insertion of opportunities should be increased or decreased. For example, the identification of weather conditions in the image analysis may indicate a likelihood of delays, which can include additional supplemental content insertion opportunities (e.g., a detection of rain in a video analysis or audio analysis of commentary that indicate a likelihood of a delay in a live streaming event). The management service further utilizes latency information associated with performance of supplemental content delivery services, such as an ad service, to increase the timing of the anticipated window (e.g., increase the window to account for latency in requesting and receiving supplemental content). In yet another example, the management service can utilize performance information related to the preparation of the supplemental content (e.g., encoding) to account for processing time in processing received supplemental content. Still further, the management service can utilize hints or keywords from social media information that indicate the potential for additional supplemental content insertion opportunities (e.g., a detection of social media posts related to additional time in a sporting event).

Utilizing the determined window, the management service will transmit requests for supplemental content from the third party supplemental content service prior the identification or request for supplemental content to be included in the streaming content, e.g., pre-fetch the supplemental content. Illustratively, the management service can manage the transmission of individual requests in a manner to receive and store sufficient supplemental content at the content delivery service provider (e.g., a pool of supplemental content) to service at least a portion of the anticipated insertion opportunities. The received supplemental content may be processed and stored in accordance with individualized supplemental content pools associated with an individual user or set of individuals. The received supplemental content can further be associated with expiration information, such as a time to live ("TTL"), to facilitate management of the received supplemental content.

In some embodiments in which the content delivery service is transmitting requests for supplemental content for a number of users (e.g., a set of parallel requests per streaming channel), the management service can further include some distribution or delays, sometimes referred to as jitter, to attempt to mitigate potential impacts to performance related to the third party supplemental content service receiving substantially simultaneous requests. For example, for individual users, the management service can factor in a delay parameter, such as a random values selected from a range of possible delay parameter values. In another example, the management service can calculate a delay parameter based on attributes of the user or content, such as a delay parameter based on a hash value of one or more attributes. The amount of delay or jitter can further be managed based on the active streaming channel metrics, such as increasing the distribution of supplemental content requests based on a current or anticipated capacity of the supplemental content service to process supplemental content requests. In other embodiments, the management service can also utilize a centralized request processing queue to receive all the requests that need to be transmitted to the third party supplemental content service and centrally manage the transmission of requests. Such a centralized request processing queue can distribute the timing of supplemental content requests across a set of users.

As the content delivery service transmits streaming content to individual users via an established channel, as markers for insertion opportunities are identified, the content delivery service will attempt to utilize the pool of pre-fetched supplemental content. In some embodiments, if a streaming channel is paused or abandoned, the pool of supplemental content may be maintained, such as according to TTL, to allow for the resumption of streaming and the ready availability of supplemental content.

With reference to the previously discussed deficiencies associated with other approaches, aspects of the present application can address potential performance issues related to third party service latency or other delays by pre-fetching the supplemental content in accordance with the established time window. Similarly, by pre-fetching in a manner that allows the supplemental content to be received and fully processed for streaming, the content delivery service provider decreases the likelihood of missing supplemental content insertion opportunities. Still further, aspects of the present application can address scaling issues by factoring third party service latencies in the determination of the time window and including some delay/jitter in the distribution of requests to third party services to minimize additional delay.

Although aspects of the present application will be described with regard to illustrative examples, such as streaming content metrics, and with regard to supplemental content that corresponds to advertisement content, one skilled in the relevant art will appreciate that the disclosed examples should be construed as limiting and that alternative implementations and forms of supplemental content are considered to be within the scope of the present application.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a content delivery service 120. Illustratively, the content delivery service 120 can correspond to one or more services utilized in the transmission of the encoded content to user device 102. The content delivery service 120 can include a video packaging and origination service that indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a video packaging and origination service can also provide advanced video transmission features such as just-in-time packaging of video content, digital rights management ("DRM") encryption, time-shifting, bitrate selection, catch up TV, and more. The content can be illustratively provided by one or more origin sources, such as original content provider 140.

User computing devices 102 may include any number of different computing devices capable of communicating with one or more communication networks 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each client computing device 102 may optionally include one or more data stores (not shown in FIG. 1) including various applications or computer-executable instructions, such as web browsers, used to implement the embodiments disclosed herein. One or more user computing devices 102 can subscribe to a streaming content channel to receive streaming content from the content delivery service provider 120. As will be explained in greater detail below, the streaming content can include dynamically inserted supplemental content (e.g., advertisement content) based on attributes of the user computing device 102 or user associated with the user computing device 102.

In some embodiments, a CDN service provider 110 may include multiple edge locations from which a user device can retrieve content. Individual edge locations 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 112 can include one or more metric information processing components 114 for processing metric information provided by client computing devices 102 and a data store 116 for maintaining collected metric information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby POP to retrieve content, thereby reducing the latency of delivering requested content.

Networks 1160 may be any wired network, wireless network, or combination thereof. In addition, the networks 160 may be a personal area network, local area network, wide area network, cable network, fiber network, satellite network, cellular telephone network, data network, or combination thereof. In the example environment of FIG. 1, network 160 includes at least a global area network (GAN), such as the Internet. Protocols and components for communicating via the other aforementioned types of communication networks are well known to those skilled in the art of computer communications and thus need not be described in more detail herein. While each of the client computing devices 102 and content delivery service 120 are depicted as having a single connection to the network 160, individual components of the client computing devices 102 and content delivery service 120 may be connected to the network 160 at disparate points. Accordingly, communication times and capabilities may vary between the components of FIG. 1.

In accordance with embodiments, for purposes of illustration, the content delivery service 120 includes one or more servers for receiving content from original content providers 140 and processing the content to make available a set of received encoded bitrate segments. The components of the content delivery service 120 may provide the encoded content to a separate stand-alone service, such as video packaging and origination service, for subsequent transmission to user computing devices 102 or a CDN service '110. In other embodiments, the illustrated components of the content delivery service 120 may be integrated or form a part of a video packaging and origination service. Accordingly, the term content delivery service 120 may be generally variable and is not limited to any particular implementation.

As described in further detail below, the content delivery service 120 includes a plurality of ingress components 122 utilized to receive encoded data streams from encoding servers 142 from content providers 140. Illustratively, the ingress components 122 can process the incoming encoded content from the original content providers 140. The content delivery service 120 also includes one or more egress components 124 for encoding decoded content into a bitrate and format for delivery to user devices. The ingress components 122 and egress components 124 may be distributed according to geographic criteria or availability zones to facilitate delivery or access to encoded content. As previously described, the ingress components 122 or egress components 124 may be implemented in a combined node or virtual machine instance that implements transcoding functionality including the functionality of the ingress components, the egress components or a combination of both. Accordingly, reference to a virtual machine instance implementing transcoding functionality is not limited to any specific combination of decoding or encoding content.

The content delivery service 120 can further include management services 126 for coordinating the receipt and processing of encoded original content from the original content provider 140. Still further, the video packing and origination service 120 can include a plurality of cache components 128 that maintain encoded content for streaming. The encoded content can be maintained in one or more distinct availability zones, such as different geographic areas or zones.

The content delivery service 120 can further include additional components for streaming individual streaming content channels and for dynamically insertion supplemental content into streaming content. Such components can include a set of individual streaming components 130 that establish individualized channel requests from user computing devices 102 and streaming the requested content to the requesting devices. The content delivery service 120 can further include a management service 132 for processing metric information regarding individual streaming content channels, determining supplemental content delivery windows, and managing the request for supplemental content to a supplemental content delivery service 150, such as an ad delivery service. The content delivery service 120 can further include various data stores for dynamically processing supplemental request insertion opportunities, including a historical information data store 134, individual channel queues or pools of received and processed supplemental content 136 and a centralized queue 138 for centrally managing supplemental content requests from a plurality of channels in accordance with some embodiments. In some embodiments, the components for managing supplemental content may be considered separate from other components of the content delivery service 120.

It will be appreciated by those skilled in the art that the content delivery service 120 may have fewer or greater components than are illustrated in FIG. 1. Thus, the depiction of the content delivery service 120 in FIG. 1 should be taken as illustrative. For example, in some embodiments, components of the content delivery service 120 may be executed by one more virtual machines implemented in a hosted computing environment. A hosted computing environment may include one or more rapidly provisioned and released computing resources, which computing resources may include computing, networking or storage devices.

With continued reference to FIG. 1, the content delivery environment 100 also includes original content providers 140. Illustratively, the original content provider can include a plurality of encoders 142 for generating multiple encoded streams for transmission to the content delivery service 120. In one embodiment, individual encoders may generate different encode versions of a content segment according to a different encoding profile. The original content provider 140 can also include logic or other management components for determining how many encoders 142 should be utilized or how to manage the addition or removal of encoders. In some embodiments, the original content provider the original content provider 140 can further include synchronization services 146 for generating synchronization information utilized by the encoders, such as sequence numbers corresponding to the set of encoded segments, time stamp information related to a relative time of the encoded segments or from which relative time of encoded segments will be based, and the like. The original content provider 140 can further include a data store 144 for maintaining encoded data for transmission. The synchronization services 124 and 146 may work in conjunction or in a complimentary basis, such as to modify the encoding of source content utilized in bypass encoding embodiments.

Figure 2:
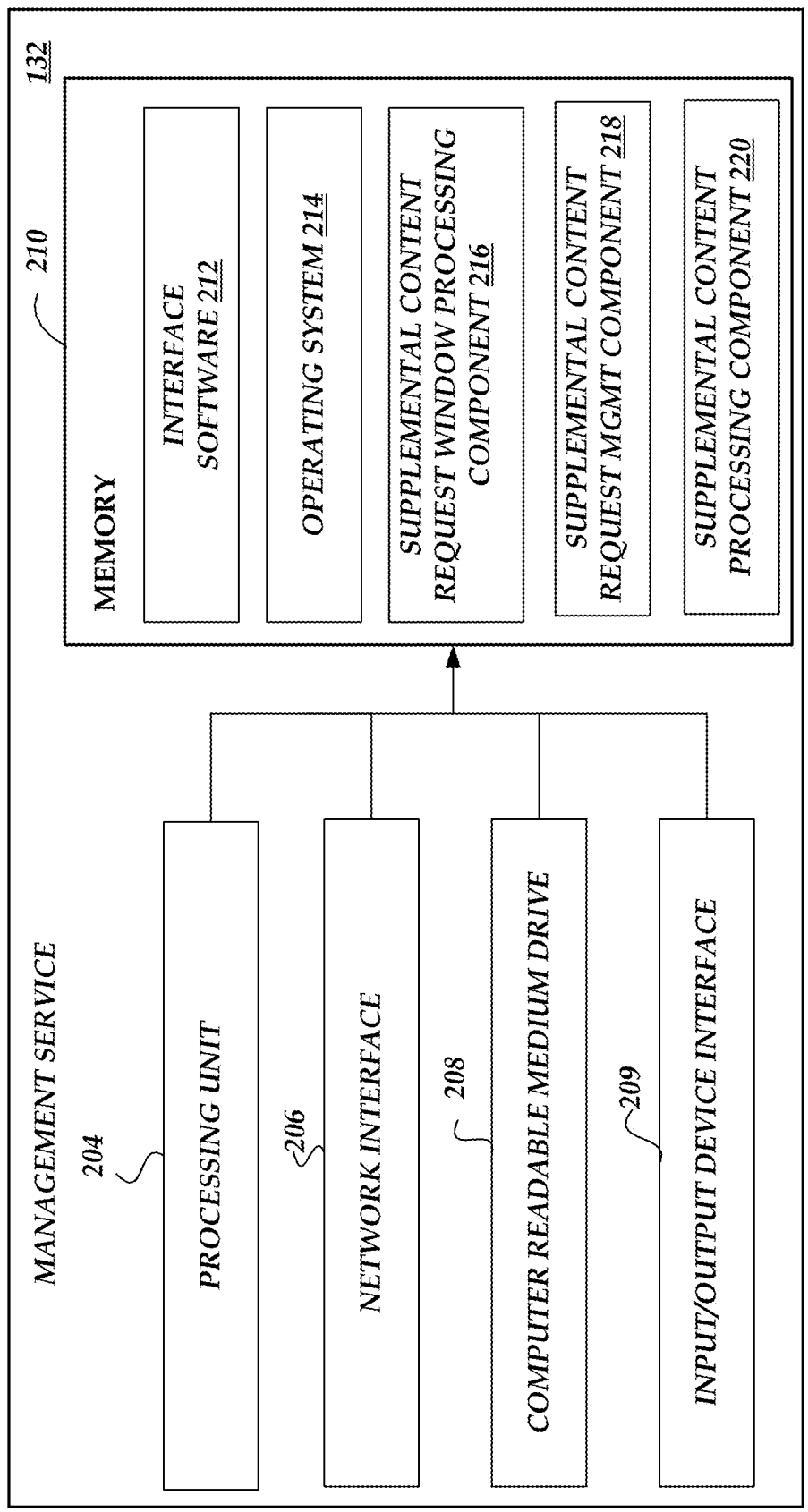
FIG. 2 is a block diagram of illustrative components of a management node configured to generate a set of compatible virtual machine instances and process channel request in accordance with illustrative embodiments.

FIG. 2 depicts one embodiment of an architecture of an illustrative server for functioning as a management service 132 of the content delivery service 120 for managing aspects of the dynamic insertion of supplemental content as described herein. The general architecture of the management service 132 depicted in FIG. 2 includes an arrangement of computer hardware and software components that may be used to implement aspects of the present disclosure. As illustrated, the management service 132 includes a processing unit 204, a network interface 206, a computer readable medium drive 208, an input/output device interface 209, all of which may communicate with one another by way of a communication bus. The components of the management service 132 may be physical hardware components or implemented in a virtualized environment.

The network interface 206 may provide connectivity to one or more networks or computing systems, such as the network 160 of FIG. 1. The processing unit 204 may thus receive information and instructions from other computing systems or services via a network. The processing unit 204 may also communicate to and from memory 210 and further provide output information for an optional display via the input/output device interface 209. In some embodiments, the management service 132 may include more (or fewer) components than those shown in FIG. 22.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the management service 132. The memory 210 may further include computer program instructions and other information for implementing aspects of the present disclosure. For example, in one embodiment, the memory 210 includes interface software 212 for receiving and processing content requests from requesting entities. Additionally, the memory 210 includes a supplemental content request window processing component 216 for determining a time window for requesting supplemental content for streaming content channel. Additionally, the management service 132 can further include a supplemental content request management component 218 for managing the transmission of requests to a supplemental content service 150, including the management or distribution of requests for different channels or the implementation of a centralized management queue. Although the management service 132 is illustrated with both the supplemental content request window processing component 216 and supplemental content request management component 218 components, in some embodiments, individual computing device forming the management service 132 may include only one of the identified components.

Figure 3:
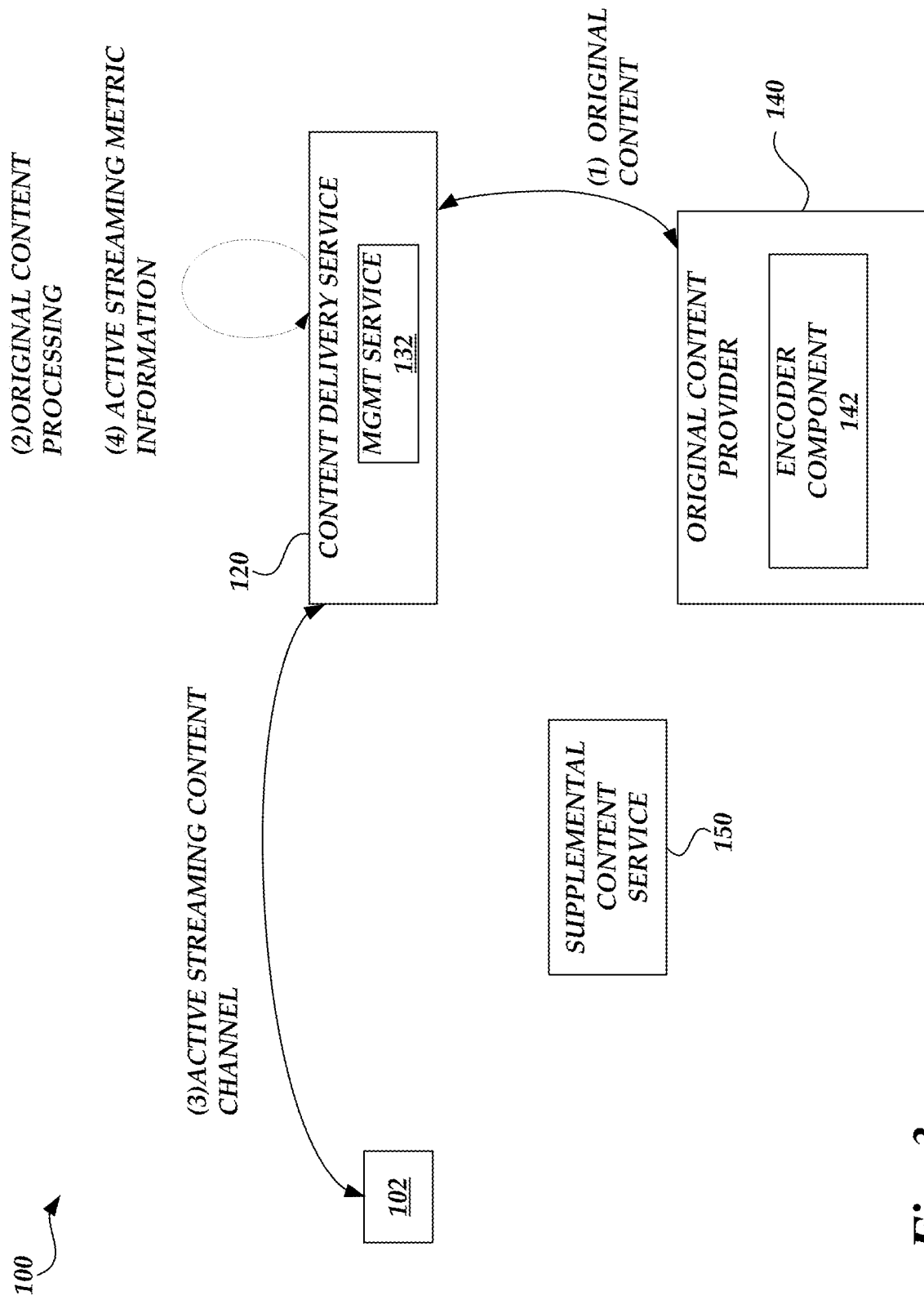
FIGS. 3 and 4 are block diagrams of the content delivery environment of FIG. 1 illustrating the prefetching of supplemental content for streaming content based on a determined request window.
Figure 4:
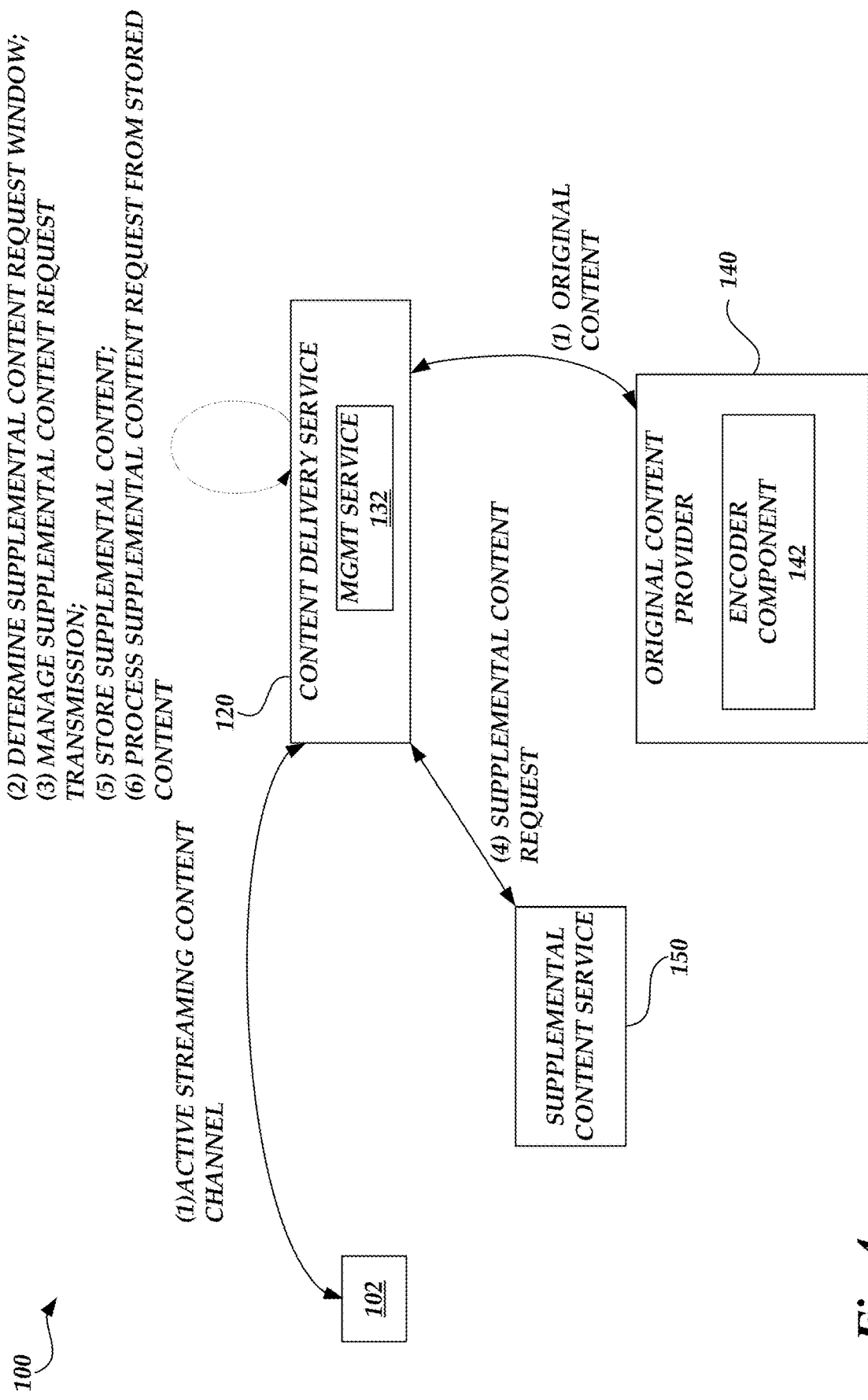

Turning now to FIGS. 3 and 4, an illustrative interaction for the dynamic insertion in streaming content will be described will be described. FIGS. 3 and 4 will be described with regard to interact between a user computing device 102 and content delivery service 120. However, although the illustrated interaction is singular in nature, one skilled in the relevant art will appreciate that the content delivery service 120 will often be interacting with a number of user computing devices 102 substantially in parallel. With reference to FIG. 3, at (1), the original content provider 140 and content delivery service 120 begin interaction to provide the original encoded content to the content delivery service for transmission. Illustratively, the original content provider 140 encodes content and transmits the content to the content delivery service 120 at a highest bitrate and format combination. As previously described, the original content provider 140 can insert markers, such as ad insertion markers, that indicate to the content delivery service 120 opportunities for inserting advertisement content. The nature and content of the insertion markers can depend on the encoding format or streaming format utilized by the original content provider. In real-time or substantially real-time streaming, the original content provider 140 will not transmit advanced notice of the upcoming marker, but will include the marker as part of the streaming.

At (2), the content delivery service 120 processes the original content by decoding the received encoded content and encoding the content into a plurality of encoding and bitrate combinations. As described above, if the content delivery service 120 support adaptive bitrate streaming, the content delivery service 120 will encode the content into each respective, supported bitrate/format combination. The resulting encoded content is subdivided into encoded content segments, which are then stored.

At (3), the user computing device 102 and content delivery service 120 begin interacting by establishing a streaming content channel. Such interaction can include the exchange of credentials, preferences, or other information required to set up the channel. Each streaming component can then obtain copies of the stored encoded content segments in the appropriate bitrate/format combination. Thereafter, the content delivery service 120 can begin the content streaming process by transmitting a manifest identifying the encoded content segments and processing requests from the user computing device 102 for each sequential encoded content segment.

At (4), the content delivery service 120 begins collecting or otherwise obtaining active streaming metrics regarding the streaming content. As described above, the active streaming metrics include, but are not limited, manifest information that identifies the segments that will form the streaming content, performance measurements regarding processing of supplemental content requests, performance measurements regarding decoding and encoding received supplemental content, frequency of the presence of supplemental content insertion markers, encoding parameters for encoding supplemental content, and the like. The metrics can also include additional information that may be considered related to, but independent of the active stream, such as social medial information, public event information, environmental information (e.g., weather), user feedback information (e.g., some form of elicited feedback from users), and the like. Additional or alternative metrics may also be collected.

With reference now to FIG. 4, at (1), the content delivery service 120 and user computing device and the original content provider 140 and content delivery service 120 continue to interact to stream encoded content (e.g., an active content stream). At (2), the content delivery service provider 120 determines a supplemental content request window that is indicative of a predicted time window in which a supplemental content insertion opportunity will occur. Illustratively, the supplemental content request window is sufficiently in advance of the occurrence of the predicted supplemental content insertion opportunity so that the content provider has time to pre-fetch supplemental content as described herein. An illustrative sub-routine for determining the supplemental content request window will be described below with regard to FIGS. 5 and 6. In some embodiments, the supplemental content request window can be based on historical streaming data and the collected/observed active streaming metrics of the current encoded content stream. The historical streaming data may serve as a baseline for predicting a number of insertion opportunities and frequency of appearance of the predicted insertion opportunities. Illustrative examples indicative of how the active streaming metrics may be used to adjust a baseline will be described herein.

At (3), the management service 132 of the content provider can manage the supplemental content request window to identify when to transmit the supplemental content request to the supplemental content service provider 150. For example, the supplemental content request window may indicate a timeframe or timestamp in the active content stream that functions as timing information for when the management service 132 can cause the transmission of supplemental content requests. The start of the supplemental content request window can correspond to a time greater than anticipated is required to request, receive and process the supplemental content prior to identification of an insertion opportunity. The supplemental content request window can further define a threshold that represents that minimal amount of time anticipated to be required to request, receive and process the supplemental content prior to identification of an insertion opportunity (or some portion slightly greater). The supplemental request window also identifies the number of supplemental content that may be required to complete the supplemental content insertion opportunity.

In one embodiment, the management service 132 may transmit the request for supplemental content upon entry into the supplement content request window. In other embodiments, individual requests for user computing devices 102 may be distributed to mitigate the potential load on simultaneous or substantial simultaneous supplemental content requests by incorporation of jitter, or other delays prior to transmitting the supplemental content request. For example, individual requests may be associated with a random number identifier that determines whether to delay the request and if so, the amount of delay. The delay may be selected from a range of possible additional delays, such as a defined length of the supplemental content request window. In another example, the delay may be calculated based on some unique or partially unique identifier, such as a hash of the user identifier or content stream. Still further, in some embodiments, the delay can be determined in conjunction with the active content stream metrics, such that reported processing delays at the supplemental content service or network latencies can increase the amount of delay or increase the distribution of delays in proportion to performance parameters. In still another embodiment, the management service 132 can maintain a centralized request processing queue such that all requests for supplemental content are managed centrally. In such embodiments, the management service 132 controls the number of parallel or substantially simultaneous requests that are transmitted to the supplemental content service 150. The management service 132 can select subsets of the centralized queue to control the frequency and number of requests that are transmitted across a set of users, grouping of users, active streaming channels, and the like.

At (4), the supplemental content processing service 150 processes the request to identify supplemental content responsive to the request. In one embodiment, each individual request for supplemental content can include various identifiers or other parameters associated with the user device 102 that facilitates at least partial customization of the returned supplemental content. The request can correspond to each individual user, grouping of users associated with some organizational criteria (e.g., two or more users associated with an organization), or individual streaming channels (independent of individual user or user accounts). Although the supplemental content service 150 is illustrated as a separate service, the supplement content service may be integrated or associated with the content delivery service to facilitate the selection of the supplemental content responsive to the request.

At (5), the management service 132 receives and processes the returned content. Illustratively, the management service 132 may need to cause the supplemental content to be encoded in a similar encoding bitrate and format as the streamed content. Additionally, the management service 132 stores the supplemental content in a pool or queue that is available for dynamic insertion when an appropriate marker is identified. In some embodiments, the management service 132 can further associate expiration criteria, such as a time to live, that allows the management service 132 to manage when supplemental content is considered "stale" or no longer available for insertion in the content stream. The supplemental content service 150 may provide some information that can set the TTL or be used to associate a TTL. Additionally, in other embodiments, in the event a streaming event is paused by the user computing device 102, the management service 132 can maintain the pool of received, processed supplemental content to allow the resumption of streaming content with available supplemental content.

At (6), during the streaming process, as supplemental content insertion opportunities are detected, the management service 132 processes the request from the pool of supplemental content without requiring an additional request to the supplemental content service 150.

Figure 5:
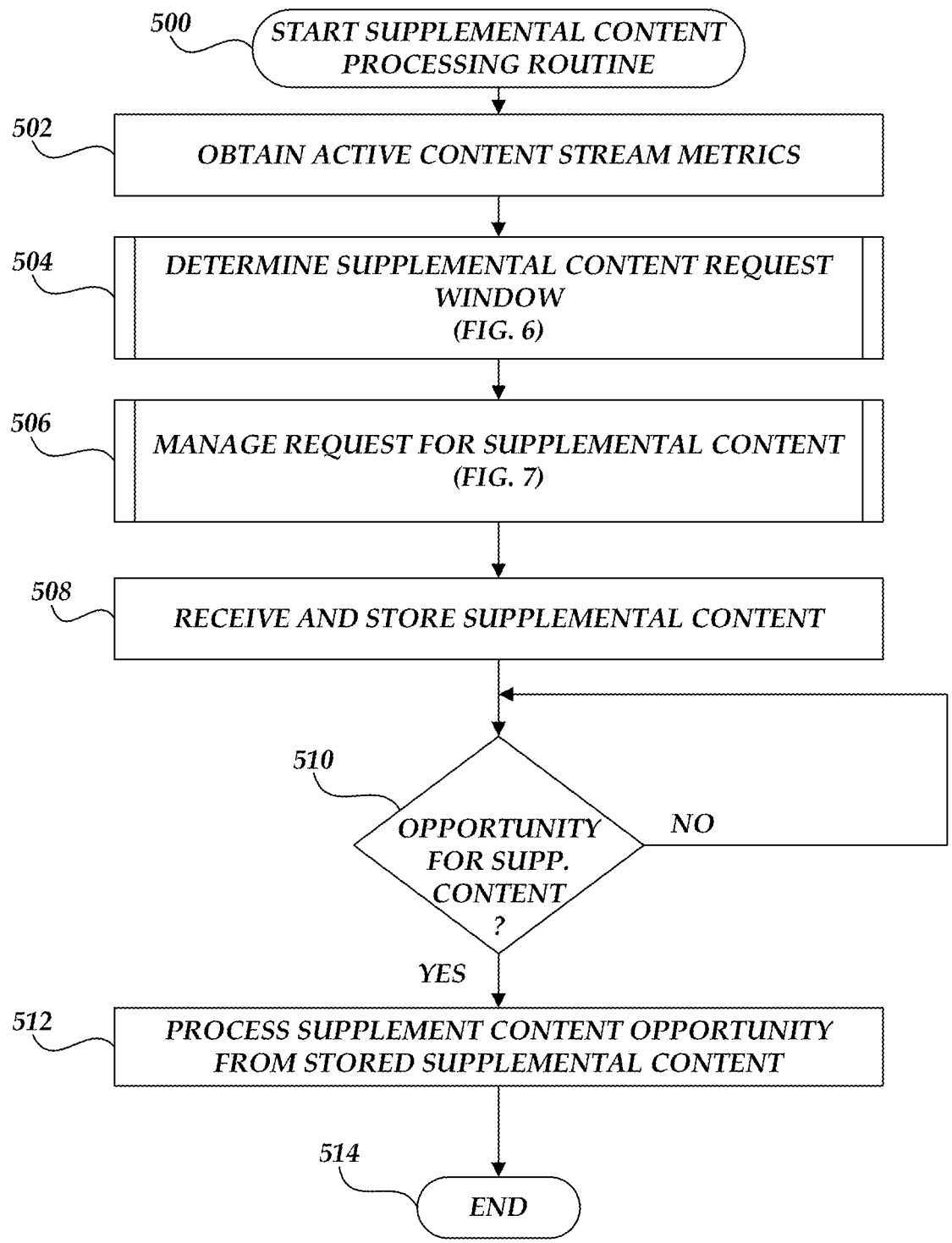
FIG. 5 is a flow diagram illustrative of a supplemental content processing routine implemented by a content delivery service.

Turning now to FIG. 5, a routine 500 utilized by the content delivery service 120 for dynamically inserting supplemental content into content streams will be described. Illustratively, routine 500 may be implemented by the management service 132 of the content delivery service 120 and will be described with regard to advertisement-based supplemental content. However, one skilled in the relevant art will appreciate that routine 500 is not limited to utilization with regard to advertisements. Additionally, routine 500 will be described with interaction for processing a supplemental content request for an active streaming channel. However, aspects of routine 500 could be implemented in parallel or substantially in parallel to correspond to a processing of multiple supplemental content requests corresponding to sets of active streaming channels. At block 502, the management service 132 collects or otherwise obtains active streaming metrics regarding the streaming content. As described above, the active streaming metrics include, but are not limited, manifest information that identifies the segments that will form the streaming content, performance measurements regarding processing of supplemental content requests, performance measurements regarding decoding and encoding received supplemental content, frequency of the presence of supplemental content insertion markers, encoding parameters for encoding supplemental content, and the like. Such metrics can also include external information or information otherwise independent of the transmission of the active streaming channel, such as social media information (e.g., keywords associated with the streaming event), environmental information (e.g., weather information), public event information (e.g., emergencies), and the like. Additional or alternative metrics may also be collected.

At block 504, the content delivery service provider 120 determines a supplemental content request window that is indicative of a predicted time window in which a supplemental content insertion opportunity will occur. Illustratively, the supplemental content request window is sufficiently in advance of the occurrence of the predicted supplemental content insertion opportunity so that the content provider has time to request, receive and process or pre-fetch supplemental content as described herein. For example, the supplemental content request window may indicate a timeframe or timestamp in the active content stream that functions as timing information for when the management service 132 can cause the transmission of supplemental content requests. The supplemental content request window can also be defined in terms of other reference points, such as common clock signals, reference frames, and the like.

Illustratively, the start of the supplemental content request window can correspond to a time greater than anticipated is required to request, receive and process the supplemental content prior to identification of an insertion opportunity. The supplemental content request window can further define a threshold that represents that minimal amount of time anticipated to be required to request, receive and process the supplemental content prior to identification of an insertion opportunity (or some portion slightly greater). An illustrative sub-routine for determining the supplemental content request window will be described below with regard to FIG. 6. In some embodiments, the supplemental content request window can be based on historical streaming data, the collected/observed active streaming metrics of the current encoded content stream, or a combination thereof. The supplemental request window also identifies the number of supplemental content that may be required to complete the supplemental content insertion opportunity. For example, a predicted insertion opportunity may require a plurality of supplement content (e.g., a set of 30-second advertisements) to be fulfilled.

At block 506, the management service manages requests for supplemental content. In one embodiment, the management service 132 may transmit the request for supplemental content upon entry into the supplement content request window. In other embodiments, individual requests for user computing devices 102 may be distributed to mitigate the potential load on simultaneous or substantial simultaneous supplemental content requests by incorporated of jitter, or other delays in the request. In another embodiment, the management service 132 can maintain a centralized request processing queue such that all requests for supplemental content are managed centrally. In such embodiments, the management service 132 controls the number of parallel or substantially simultaneous requests that are transmitted to the supplemental content service 150. An illustrative sub-routine for managing the transmission of supplemental content requests will be described with regard to FIG. 7.

Illustratively, the supplemental content processing service 150 processes the request to identify supplemental content responsive to the request. In one embodiment, each individual request for supplemental content can include various identifiers or other parameters associated with the user device 102 that facilitates at least partial customization of the returned supplemental content. As described above, the request for supplemental content may be unique to individual users, sets of users, active streaming channel, or other organizational or selection criteria. The determination of which parameters are included in the request or access responsive to the request can be determined based on time of day, passed credentials, user or system administrator configurations, geographic identifiers, regional identifiers, organizational identifiers, and the like. In other embodiments, the supplemental content service 150 can further include some form of default criteria if none are provided. Although the supplemental content service 150 is illustrated as a separate service, the supplement content service may be integrated or associated with the content delivery service to facilitate the selection of the supplemental content responsive to the request.

At block 508, the management service 132 receives and processes the returned content. Illustratively, the management service 132 may need to cause the supplemental content to be encoded in a similar encoding bitrate and format as the streamed content. Additionally, the management service 132 stores the supplemental content in a pool or queue that is available for dynamic insertion when an appropriate marker is identified. In some embodiments, the management service 132 can further associate expiration criteria, such as a time to live, that allows the management service 132 to manage when supplemental content is considered "stale" or no longer available for insertion in the content stream. The supplemental content service 150 may provide some information that can set the TTL or be used to associate a TTL. Additionally, in other embodiments, in the event a streaming event is paused by the user computing device 102, the management service 132 can maintain the pool of received, processed supplemental content to allow the resumption of streaming content with available supplemental content.

At decision block 510, a test is conducted to determine whether there is a request or identified insertion opportunity for supplemental content. For example, during the streaming process, as supplemental content insertion opportunities are detected, the management service 132 processes the marker. Alternatively, if a different component is processing the content stream, the component may generate a request for supplemental content upon identification/processing. If there is no supplemental content insertion opportunity, the routine 500 returns to decision block 510. In some embodiments, the routine 500 may continue to loop until the TTL of the stored content expires. Alternatively, once a supplemental content insertion point is identified or received, at block 512, the management service 132 processes the request/opportunity from the pool of supplemental content without requiring an additional request to the supplemental content service 150. At block 514, the routine 500 terminates.

Figure 6:
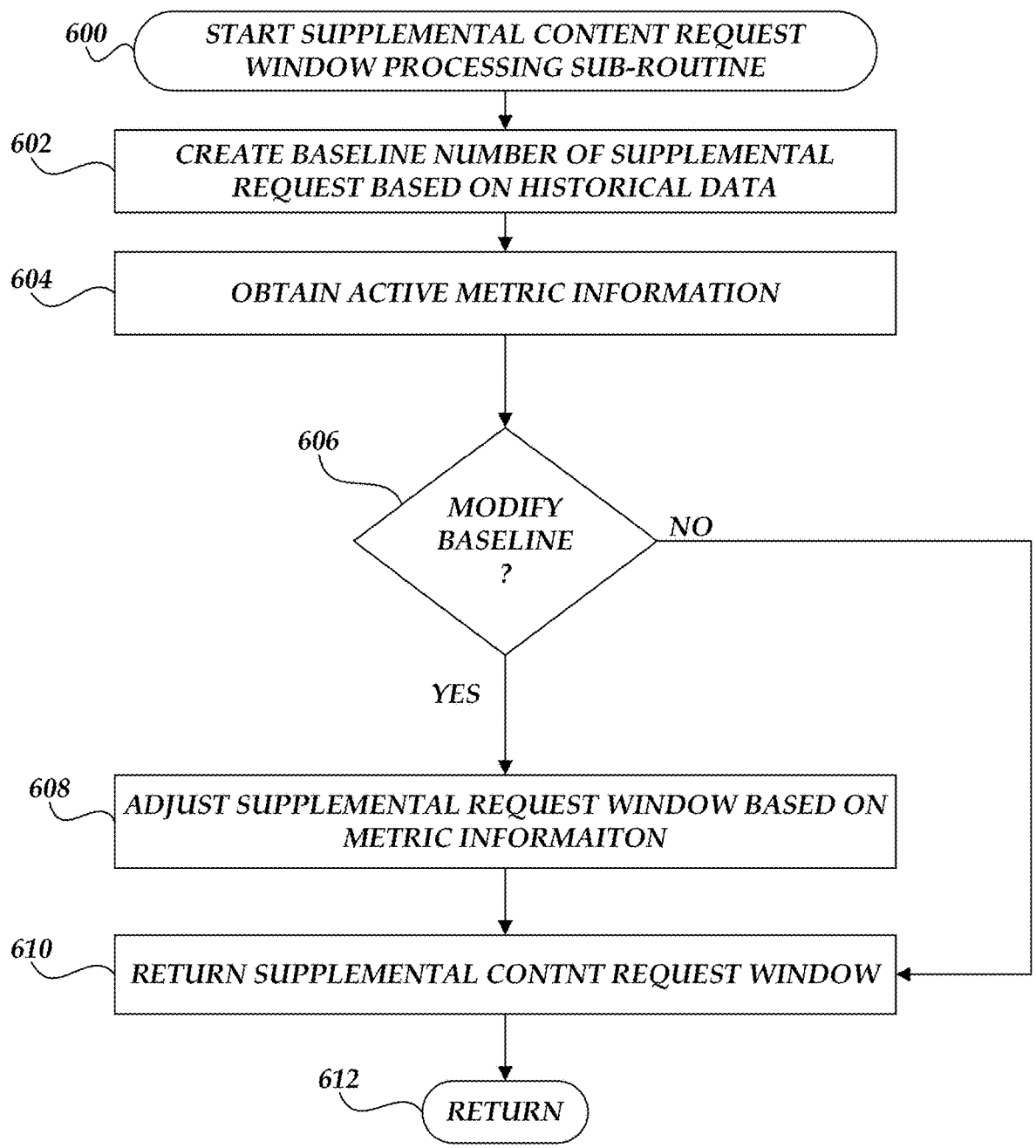
FIG. 6 is a flow diagram illustrative of a supplemental content request window processing sub-routine implemented by a content delivery service.

Turning now to FIG. 6, a sub-routine 600 utilized by the content delivery service 120 for determining or updating a supplemental content request window will be described. Illustratively, routine 600 may be implemented by the management service 132 of the content delivery service 120. At block 602, the management service 132 creates a baseline number of supplemental content requests based on historical data. Illustratively, the encoded content can be associated with different identifiers or characteristics corresponding to the type of encoded content, source of encoded content, and the like. For example, with regard to a sporting event active streaming channel, an encoded content can be characterized as a sporting event, type of sporting event (e.g., baseball game), teams involved in the sporting event, players involved in the sporting event, location of the sporting event, or other identifiers. Based on the characteristics, the management service 132 can utilize historical metrics that identify the typical number of supplemental content insertion opportunities, the frequency or pattern of appearance, and predicated times in the streaming content timeline in which they will be predicted to occur. In another example, the management service 132 can utilize historical information related to the specific content stream that identifies the same information related to timing and frequency currently being experienced. In still another example, the management service 132 can utilize historical information associated with additional organizational criteria, such as time of day, regional descriptions, content provider, and the like.

If multiple portions of historical information are available, the management service 132 can prioritize or select which historical information to use, especially if there are significant conflicts in the historical information. In other embodiments, the management service 132 can blend or weigh the multiple instances of historical information, or apply machine learning principles to process the data. Still further, machine learning or other data processing algorithms can be utilized to process historical information in a manner to generate the baseline information.

At block 604, the management service 132 obtains active metric information as described above. As described above, the metrics include, but are not limited to, manifest information that identifies the segments that will form the streaming content, performance measurements regarding processing of supplemental content requests, performance measurements regarding decoding and encoding received supplemental content, frequency of the presence of supplemental content insertion markers, encoding parameters for encoding supplemental content, and the like. The active metric information can also include external information or information otherwise independent of the transmission of the active streaming channel, such as social media information, weather information, public event information and the like.

Illustratively, the management service 132 will look to active streaming metrics that may modify the request processing window. At decision block 606, a test is conducted to determine whether to modify the baseline numbers from the historical data. If not, the sub-routine 600 proceeds to block 610. Alternatively, at block 608, the management service 132 adjusts the supplemental request window according to the metric information. By way of illustrative example, the adjustment to the window can include additional time related to current or anticipated performance measurements regarding processing of supplemental content requests by the supplemental content processing service 150. For example, if the supplemental content processing service 150 is experiencing additional latencies, the time window will be increased to accommodate for the additional latency. Similarly, if the supplemental content processing service 150 is experiencing increased error rates or a threshold error rate, the time window can be increased to adjust for retries. In another example, the adjustment to the window can include additional time related to performance measurements regarding decoding and encoding received supplemental content once it is received at the content delivery service 120. In still another example, the adjustment to the window can include adjustments for network-based latencies in transmitting or receiving the supplemental content. Still further, the management service 132 can use video or audio analysis techniques to interpret events that have been associated with changes to the insertion opportunities. For example, a video frame analysis indicative of weather conditions (e.g., rain or sunshine) can increase or decrease the determined baseline number of insertion opportunities or frequency of insertion opportunities. Si In accordance with still further examples related to external information or information otherwise independent of the transmission of the active streaming channel, with regard to social media information, the management service 132 can process keywords or other descriptions to determine whether the time window should be adjusted. For example, the management service 132 can look for keywords (e.g. "overtime", "time-out", "boring", etc.) that may indicate that the original content provider 140 may be inserting additional insertion opportunities or that the frequency of insertion opportunities is likely to change. In another example, the management service 132 may receive and process weather information (e.g., prediction of rain) or public event information (e.g., attendance at an event) that can be used to adjust the timing window. For example, if current weather conditions are not indicative of rain, the management service 132 can associate less weight or adjust down historical information in which weather delays increased the number of insertion opportunities or the frequency of insertion opportunities.

At block 610, the management service 132 returns the number of supplemental content insertion opportunities and timing information to form the timing window for requesting supplemental content. Sub-routine 600 returns at block 612.

Figure 7:
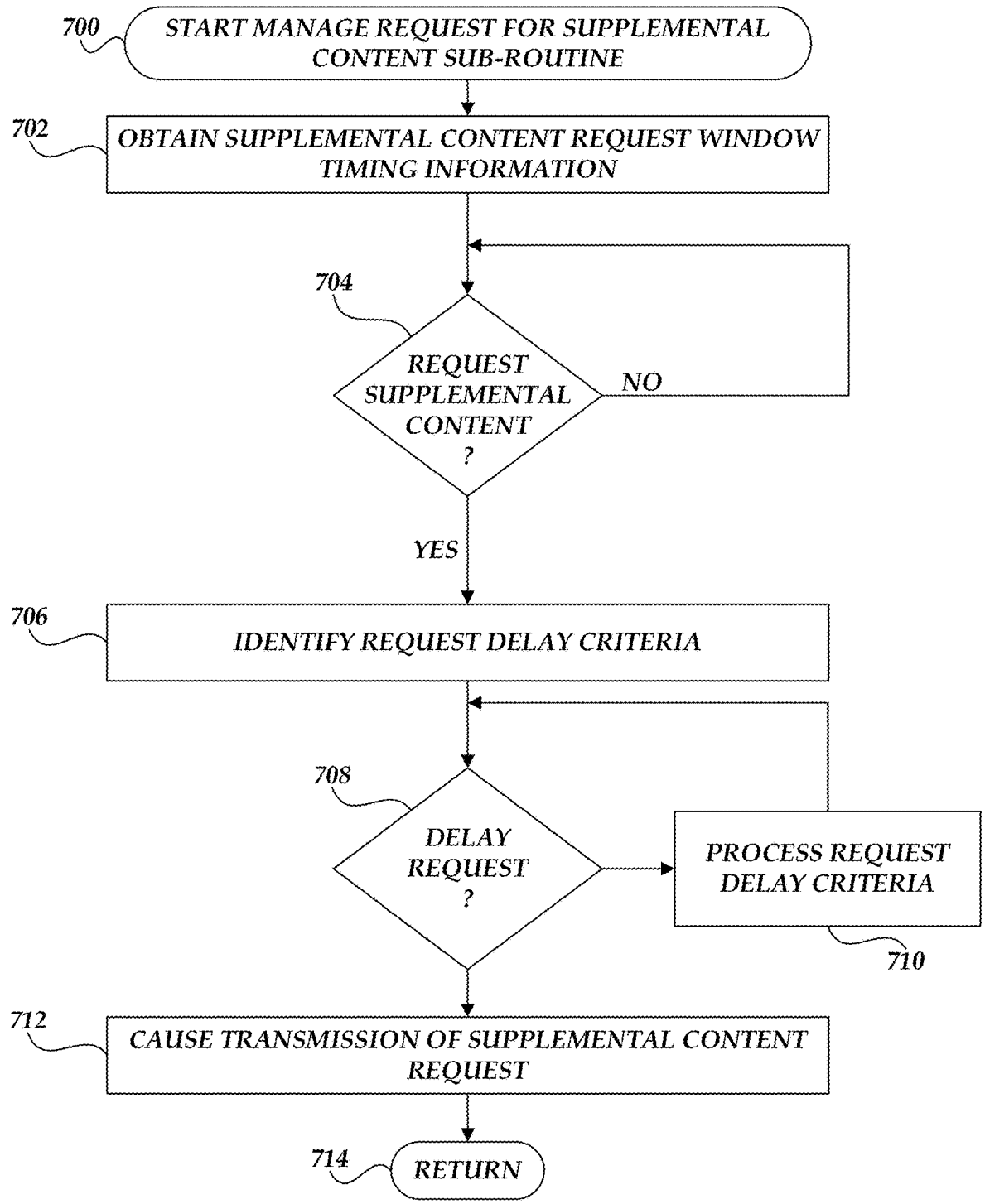
FIG. 7 is a flow diagram illustrative of a supplement content request transmission management sub-routine implemented by a content delivery service.

With reference now to FIG. 7, a supplement content request transmission management sub-routine 700 implemented by a management component 132 of a content delivery service 120 will be described. As described above, in one embodiment, individual requests for user computing devices 102 may be distributed to mitigate the potential load on simultaneous or substantial simultaneous supplemental content requests by incorporated of jitter, or other delays in the request. In another embodiment, the management service 132 can maintain a centralized request processing queue such that all requests for supplemental content are managed centrally. In such embodiments, the management service 132 controls the number of parallel or substantially simultaneous requests that are transmitted to the supplemental content service 150 in addition to the management of the calculated time window described above.

At block 702, the management service 132 obtains the previously calculated supplemental content request window. At decision block 704, a test is conducted to determine whether to transmit the request for supplemental content. In one embodiment, the management service 132 may transmit the request for supplemental content upon entry into the supplemental content request window. As described above, the supplemental content request window can be specified based on timing information in the streaming content, clock information or other timing or reference information that can be utilized by the by the management service 132. If the supplemental content request window has not been reached yet, the sub-routine 700 returns to decision block 704.

Alternatively, once the management service 132 has determined that the supplemental content request window is indicative of an opportunity to request supplemental content, at block 706, the management service 132 obtains or identifies request delay criteria. In one embodiment, supplemental content requests can be transmitted and managed as each individual channel streaming component 130. Accordingly, the request delay criteria can correspond to a measure of time selected by the individual streaming component 130. In one embodiment, the delay can correspond to a fixed amount of time that is added to the entry of the supplemental content request window. In another embodiment, the delay can correspond to a random selection of time within the supplemental content request window. The random time selection can be selected within a range of times, such as if the supplemental content request window is defined as a range of values. In still further embodiments, the management service 132 can dynamically adjust the delay by evaluation of the streaming metrics. For example, the management service 132 can increase or decrease the delay or range of delay values based on performance information. The delay criteria can also include a selection, specifically or randomly, of no delay.

As described above, in other embodiments, the management service 132 may centrally manage the distribution of supplemental content requests. In such embodiments, the delay criteria can correspond to an interval of time in which the management component 132 will transmit individual supplemental content requests. In other embodiments, the management component 132 can determine a number of supplemental content requests that will be transmitted in a batch format. The delay criteria can be of a fixed length or incrementally increased or decreased. For example, the management service 132 can increase or decrease the delay or range of delay values based on performance information.

At decision block 708, the management component 132 determines whether to delay the transmission. If no delay is selected or if the delay is not enabled, the sub-routine 700 proceeds to block 712 to cause a transmission of the request or requests for supplemental content. Alternatively, if a delay is selected, at block 710, the management component 132 processes the determined delay. The sub-routine 700 proceeds to block 712 to cause the transmission of the request or requests for supplemental content. Sub-routine 700 returns at block 714.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage delivery of content streams, the system comprising:
    one or more computing devices associated with a content delivery management service, wherein the content delivery management service is configured to:
        obtain active content stream metric information related to transmission of an active content stream to user devices;
        identify a supplemental content request window based at least in part on the active content stream metric information and delay criteria associated with providers of supplemental content, wherein the supplemental content request window identifies a number and timing of requests to provide supplemental content, the requests corresponding to predicted supplemental content insertion opportunities;
        transmit one or more requests to provide supplemental content based at least in part on the supplemental content request window and the delay criteria;
        receive supplemental content from one or more supplemental content providers in response to the one or more requests;
        identify a supplemental content insertion opportunity in the active content stream; and
        in response to the identified supplemental content insertion opportunity, cause insertion of at least a portion of the received supplemental content into the active content stream.

2. The system of claim 1, wherein the content delivery management service identifies the supplemental content request window based on setting a baseline number of insertion opportunities from historical information.

3. The system of claim 2, wherein the content delivery management service adjusts the baseline number of insertion opportunities based on at least one performance metric.

4. The system of claim 1, wherein the content delivery management service causes a transmission of at least one request for supplemental content by individually managing supplemental content requests.

5. The system of claim 1, wherein the content delivery management service causes a transmission of at least one request for supplemental content by maintaining a central pool to manage supplemental content requests for a plurality of user devices.

6. A computer-implemented method to manage delivery of content streams, the computer-implemented method comprising:
    for active streaming content, determining a supplemental content request window based on at least one of historical information associated with providers of supplemental content or active content stream metric information, wherein the supplemental content request window identifies a number and timing of requests to provide supplemental content, and wherein each of the requests is associated with a predicted supplemental content insertion opportunity;
    evaluating an additional delay prior to causing transmission of at least one request to provide supplemental content based on the supplemental content request window;
    causing transmission of the at least one request to provide supplemental content at a time based on the supplemental content request window and evaluating the additional delay; and
    causing insertion of one or more received supplemental content into the active streaming content in response to an identified supplemental content insertion opportunity.

7. The computer-implemented method of claim 6 further comprising obtaining the active content stream metric information related to transmission of the active streaming content to user devices.

8. The computer-implemented method of claim 6, wherein determining a supplemental content request window includes determining a baseline number of supplemental content insertion opportunities and baseline frequency of supplemental content insertion opportunities.

9. The computer-implemented method of claim 6, wherein evaluating the additional delay prior to causing a transmission of at least one request to provide supplemental content includes adding the additional delay in the transmission of the supplemental content request.

10. The computer-implemented method of claim 9, wherein the additional delay corresponds to a randomly selected number.

11. The computer-implemented method of claim 10, wherein the randomly selected number is selected from a range defined in the supplemental content request window.

12. The computer-implemented method of claim 9 further comprising dynamically adjusting the additional delay based on the active content stream metric information.

13. The computer-implemented method of claim 6 further comprising maintaining a central pool to manage supplemental content requests for a plurality of user devices.

14. The computer-implemented method of claim 13, wherein maintaining the central pool includes configuring a transmission frequency for the central pool.

15. The computer-implemented method of claim 13, wherein maintaining the central pool includes configuring a batch transmission for the central pool.

16. A computer-implemented method to manage delivery of content streams, the computer-implemented method comprising:
for active streaming content, causing transmission of a first request for supplemental content based on a combination of a supplemental content request window and an additional request delay, wherein the supplemental content request window identifies a number and timing of requests to provide supplemental content, and wherein the additional request delay is determined for individual providers of supplemental content based at least in part on historical information; and
causing insertion of one or more received supplemental content into the active streaming content in response to an identified supplemental content insertion opportunity.

17. The computer-implemented method of claim 16, wherein the additional request delay is determined based at least in part on a second request for supplemental content.

18. The computer-implemented method of claim 17, wherein the additional request delay corresponds to zero delay.

19. The computer-implemented method of claim 16 further comprising dynamically adjusting the additional request delay based on an active content stream metric.

20. The computer-implemented method of claim 16 further comprising maintaining a central pool to manage supplemental content requests for a plurality of user devices.

21. The computer-implemented method of claim 20, wherein maintaining the central pool includes configuring a transmission frequency for the central pool.

22. The computer-implemented method of claim 21, wherein maintaining the central pool includes configuring a batch transmission for the central pool.

* * * * *